US008995420B2

(12) United States Patent  
Meng et al.

(10) Patent No.: US 8,995,420 B2  
(45) Date of Patent: Mar. 31, 2015

(54) TRANSMITTER WITH MULTIPLE ANTENNAS AND DATA TRANSMISSION METHOD IN THE TRANSMITTER WITH MULTIPLE ANTENNAS

(75) Inventors: Yan Meng, Shanghai (CN); Mingli You, Shanghai (CN); Jin Liu, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 564 days.

(21) Appl. No.: 13/266,298

(22) PCT Filed: Apr. 28, 2009

(86) PCT No.: PCT/CN2009/000458  
§ 371 (c)(1),  
(2), (4) Date: Oct. 26, 2011

(87) PCT Pub. No.: WO2010/124414  
PCT Pub. Date: Nov. 4, 2010

(65) Prior Publication Data  
US 2012/0069807 A1  Mar. 22, 2012

(51) Int. Cl.  
*H04J 3/00* (2006.01)  
*H04B 7/06* (2006.01)  
(Continued)

(52) U.S. Cl.  
CPC ............... *H04B 7/06* (2013.01); *H04L 5/0023* (2013.01); *H04L 5/0044* (2013.01); *H04L 27/2636* (2013.01); *H04B 7/0697* (2013.01)  
USPC .......................................... 370/344; 370/329

(58) Field of Classification Search  
CPC .. H04L 5/0051; H04L 25/0226; H04W 72/04  
USPC .......................................................... 370/344  
See application file for complete search history.

(56) References Cited

U.S. PATENT DOCUMENTS

2004/0081073 A1  4/2004  Walton et al.  
2005/0195733 A1  9/2005  Walton et al.  
(Continued)

FOREIGN PATENT DOCUMENTS

CN   1717889 A   1/2006  
CN   1951031 A   4/2007  
(Continued)

OTHER PUBLICATIONS

3GPP TSG RAN WG1 Meeting #55bis, hereinafter Meeting #55bis, Jan. 12-16, 2009. IDS.*  
(Continued)

*Primary Examiner* — Wanda Z Russell  
(74) *Attorney, Agent, or Firm* — Fay Sharpe LLP

(57) ABSTRACT

According to one aspect of the present invention, a multi-antenna transmitter is provided. The transmitter includes: a data block acquiring device for acquiring multiple data streams, wherein each data stream includes data blocks at multiple slots; and a grouping and mapping device for grouping and mapping each data block, wherein the data blocks at the same slot in each data stream are grouped according to the number of the antennas and each group is mapped to one of the antennas respectively, and the different data blocks in the same group are mapped to different sub-bands respectively; and wherein grouping and mapping manners which are not exactly the same are adopted for the data blocks at different slots, and the grouping and mapping manners include data block grouping manners, group-to-antenna mapping manners, and sub-band mapping manners. And the groups of data blocks at the multiple slots are transmitted via the antennas. With the technical solutions of the present invention, a reduced PAPR during data transmission can be achieved while the diversity gain is guaranteed.

15 Claims, 5 Drawing Sheets

(51) Int. Cl.
*H04L 5/00* (2006.01)
*H04L 27/26* (2006.01)

(56) References Cited

U.S. PATENT DOCUMENTS

2009/0010238 A1* 1/2009 Barak et al. .................. 370/342
2011/0261774 A1* 10/2011 Lunttila et al. ................ 370/329
2012/0057543 A1* 3/2012 Yokomura et al. ............ 370/329

FOREIGN PATENT DOCUMENTS

| CN | 101764636 | * | 12/2008 |
| EP | 1223702 A1 | | 7/2002 |
| WO | WO2008114158 A1 | | 9/2008 |

OTHER PUBLICATIONS

Supplementary European Search Report for corresponding European Application No. 09843826.0, dated Feb. 21, 2014, 8 pages.
"UL Multiple Access with 4-Tx Antennas Transmit Diversity for Carrier Aggregation," Alcatel Shanghai Bell, Alcatel-Lucent, 3GPP TSG RAN WG1 Meeting #55bis, Ljubljana, Slovenia, Jan. 12-16, 2009, 8 pages.
International Search Report for PCT/CN2009/000458 dated Feb. 11, 2010.
Notice of Reason for Refusal for corresponding Japanese Application No. 2012-507559, dated Dec. 13, 2013, 8 pages.
Nortel, "Clustered DFT-S-OFDM Transmission from Multiple Transmit Antennas," 3GPP TSG-RAN WG1 #56, R1-090752, Athens, Greece, Feb. 9-13, 2009, Agenda Item: 12.3, Document for: Discussion/Decision, 6 pages.
Examiner Office Letter for corresponding Japanese Application No. 2012-507559, dated Apr. 25, 2013, 6 pages.
Alcatel-Lucent Shanghai Bell, Alcatel-Lucent, "Joint Spatial Multiplexing with Transmit Antenna Switching for LTE-Advanced Uplink SU-MIMO," 3GPP TSG RAN WG1 Meeting #68, Athens, Greece, Feb. 8-13, 2009, R1-080771, Agenda Item: 12.3, Document for: Discussion, 7 pages.
Alcatel-Lucent Shanghai Bell, Alcalel-Lucent, "Codeword Shifting for Clustered DFT-5-OFDM and N x DFT-S-OFDM for LTE-Advanced Uplink SU-MIMO," 3GPP TSG RAN WG1 Meeting #56bis, Seoul, Korea, Mar. 23-27, 2009, R1-091480, Agenda Item: 15.5, Document for: Discussion, 6 pages.

* cited by examiner

TRANSMITTER WITH MULTIPLE ANTENNAS AND DATA TRANSMISSION METHOD IN THE TRANSMITTER WITH MULTIPLE ANTENNAS

FIELD OF THE INVENTION

The present invention generally relates to communication technology, and more particularly, to DFT-S-OFDM technology.

BACKGROUND OF THE INVENTION

Clustered discrete Fourier transform-spread orthogonal frequency-division multiplexing (hereinafter represented as clustered DFT-S-OFDM for short) has been accepted as an uplink multiple access solution for LTE-Advanced. In clustered DFT-S-OFDM, the output of a DFT block is divided into a few clusters and each cluster of data is separately mapped to a sub-band. This discontinuous radio band allocation makes clustered DFT-S-OFDM distinguished from SC-FDMA (Single Carrier—Frequency Division Multiple Access). Although this feature provides more frequency diversity gain, it has the disadvantage of increasing the PAPR (Peak-to-Average Power Ratio).

FIG. 1 illustrates the structure of a prior art transmitter employing clustered DFT-S-OFDM. As shown in FIG. 1, after the date is Turbo coded, modulated, and 2M-point discrete Fourier transformed, the output of the DFT block is divided into two clusters. The two clusters of data blocks are mapped to sub-band 1 and sub-band 2 respectively, and are finally transmitted via an antenna. The transmitter solution shown in FIG. 1 is called prior art solution 1 hereinafter. As described above, the disadvantage of the solution lies in its high PAPR.

There has been proposed a grouping method used in DFT-S-OFDM. In this method, two clustered of modulated data are allocated to two antennas and each cluster of data is transmitted via one of the antennas, thereby mitigating the PAPR. FIG. 2 illustrates the structure of a transmitter according to this method. As shown in FIG. 2, the data is divided into two clusters after being Turbo coded and modulated, and the two clusters of data are discrete Fourier transformed separately. The first cluster of data is mapped to sub-band 1 and transmitted via antenna 1, while the second cluster of data is mapped to sub-band 2 and transmitted via antenna 2. In this method, each transmit antenna corresponds to a cluster of data, thereby mitigating the PAPR. However, a portion of frequency diversity gain is lost. The transmitter solution shown in FIG. 2 is called prior art solution 2 hereinafter.

SUMMARY OF THE INVENTION

The present invention provides a data transmission solution used in a mu antenna transmitter to solve the problem in the prior art. The solution is particularly suitable for use in clustered DFT-S-OFDM.

According to a first aspect of the present invention, a method of transmitting data via a multi-antenna transmitter s provided. The method includes: A. acquiring multiple data streams, wherein each data stream includes data blocks at multiple slots; B. grouping and mapping each data block, wherein the data blocks at the same slot in each data stream are grouped according to the number of the antennas and each group is mapped to one of the antennas respectively, and the different data blocks in the same group are mapped to different sub-bands respectively; and wherein grouping and mapping manners which are not exactly the same arc adopted for the data blocks at different slots, and the grouping and mapping manners include data block grouping manners, group-to-antenna mapping manners, and sub-band mapping manners; C. transmitting the groups of data blocks at the multiple slots via the antennas respectively.

According to a second aspect of the present invention, a multi-antenna transmitter is provided. The transmitter includes: a data block acquiring device for acquiring multiple data streams, wherein each data stream includes data blocks at multiple slots; and a grouping and mapping device for grouping and mapping each data block, wherein the data blocks at the same slot in each data stream are grouped according to the number of the antennas and each group is mapped to one of the antennas respectively, and the different data blocks in the same group are mapped to different sub-bands respectively; and wherein grouping and mapping manners which are not exactly the same are adopted for the data blocks at different slots, and the grouping and mapping manners include data block grouping manners, group-to-antenna mapping manners, and sub-band mapping manners. And the groups of data blocks at the multiple slots are transmitted via the antennas respectively.

With the technical solutions of the present invention, a reduced PAPR during data transmission can be achieved while the diversity gain is guaranteed.

BRIEF DESCRIPTION OF THE DRAWINGS

Other features, objectives and advantages of the present invention will become more apparent after reading the following detailed description of non-limiting embodiments, reference to the accompanying drawings, wherein below.

Wherein the same or similar reference signs represent the same or similar step features or devices (modules).

DETAILED DESCRIPTION OF PREFERRED EMBODIMENTS

Figure 1:
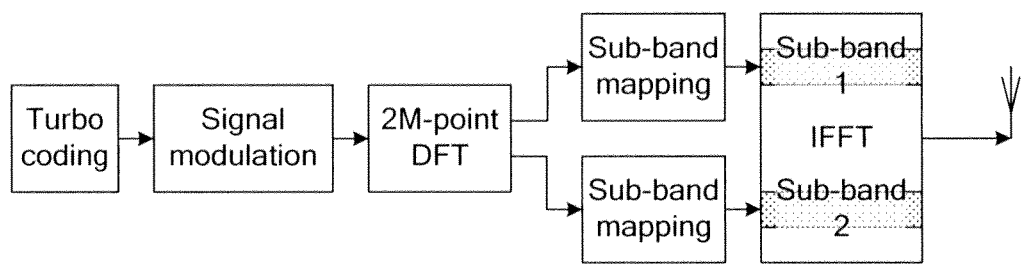
FIG. 1 is a structural block diagram illustrating a prior art transmitter employing clustered DFT-S-OFDM.
Figure 2:
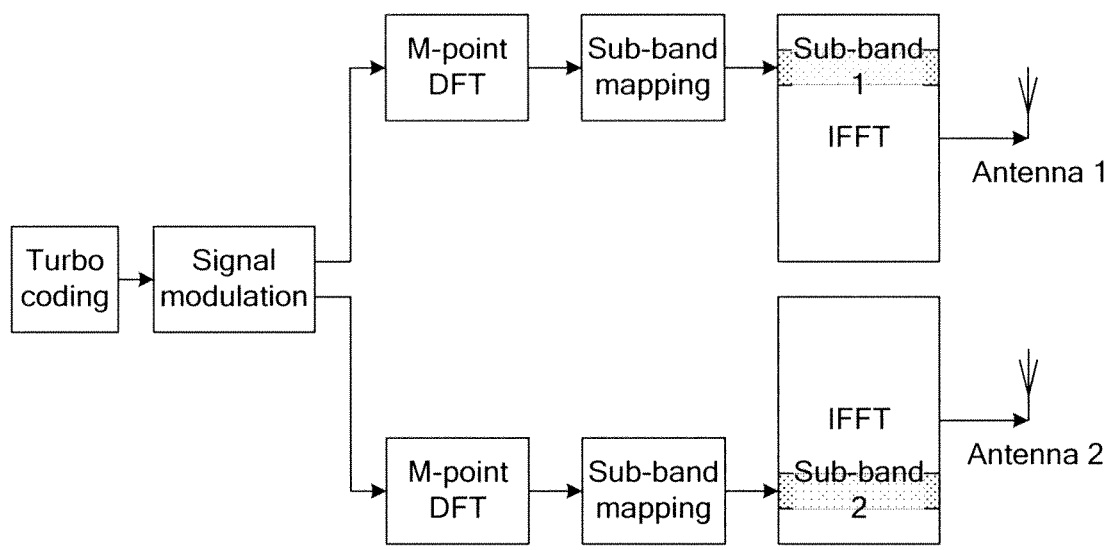
FIG. 2 is a structural block diagram illustrating a prior art transmitter employing multi-antenna clustered DFT-S-OFDM.
Figure 3:
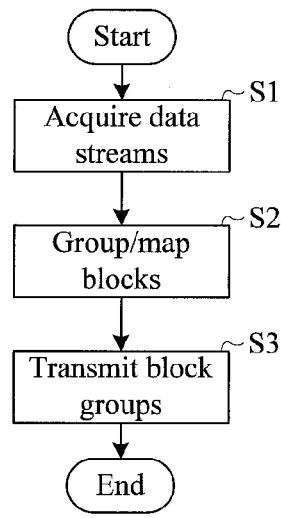
FIG. 3 is a flowchart illustrating a method of transmitting data via a multi-antenna transmitter according to an embodiment of the present invention.

FIG. 3 is a flowchart illustrating a method of transmitting data via a multi-antenna transmitter according to an embodiment of the present invention.

Firstly, in step S1, multiple data streams are acquired, wherein each data stream includes data blocks at multiple slots;

Secondly, in step S2, each data block is grouped and mapped, wherein the data blocks at the same slot in each data stream are grouped according to the number of the antennas and each group is mapped to one of the multiple antennas respectively, and the different data blocks in the same group are mapped to different sub-bands respectively; and wherein grouping and mapping manners which are not exactly the same are adopted for the data blocks at different slots, and the grouping and mapping manners include data block grouping manners, group-to-antenna mapping manners, and sub-band mapping manners;

Finally, in step S3, the groups of data blocks at the multiple slots are transmitted via the multiple antennas respectively.

According to an embodiment of the method of transmitting data via the multi-antenna transmitter of the present invention, the data transmission employs clustered DFT-S-OFDM.

According to an embodiment of the method of transmitting data via the multi-antenna transmitter of the present invention, in step S2 each data block at the same slot is mapped to a different sub-band respectively.

According to an embodiment of the method of transmitting data via the multi-antenna transmitter of the present invention, all the sub-bands are discontinuous.

According to an embodiment of the method of transmitting data via the multi-antenna transmitter of the present invention, in step S2 the same data block grouping manner and different group-to-antenna mapping manners are adopted for the data blocks at different slots.

According to an embodiment of the method of transmitting data via the multi-antenna transmitter of the present invention, in step S2 the same data block grouping manner, the same group-to-antenna mapping manner and different sub-band mapping manners are adopted for the data blocks at different slots.

According to an embodiment of the method of transmitting data via the multi-antenna transmitter of the present invention, in step S1 the multiple data streams acquired include the data blocks at two slots respectively.

According to an embodiment of the method of transmitting data via the multi-antenna transmitter of the present invention, the method of transmitting data is utilized for uplink data transmission.

According to an embodiment of the method of transmitting data via the multi-antenna transmitter of the present invention, the multi-antenna transmitter includes two antennas.

According to an embodiment of the method of transmitting data via the multi-antenna transmitter of the present invention, in step S1 two data streams are acquired, each including the data blocks at multiple slots; and in step S2 two data blocks at the same slot are mapped to the two antennas respectively and to different sub-bands respectively.

According to an embodiment of the method of transmitting data via the multi-antenna transmitter of the present invention, the two data streams acquired in step S1 include the data blocks at two slots respectively.

According to an embodiment of the method of transmitting data via the multi-antenna transmitter of the present invention, in step S2 the data blocks in the two data streams acquired in step S1 are mapped to one of the two antennas respectively and the data blocks at the two slots in the same data stream are mapped to different sub-bands respectively.

According to an embodiment of the method of transmitting data via the multi-antenna transmitter of the present invention, in step S2 the data blocks at the two slots in the same data stream are mapped to one of the two antennas respectively.

According to an embodiment of the method of transmitting data via the multi-antenna transmitter of the present invention, in step S1 four data streams are acquired, each including the data blocks at multiple slots; and in step S2 four data blocks at the same slot are grouped to two groups, each including two data blocks, and the two groups of data blocks are mapped to one of the two antennas respectively, and the two data blocks in the same group are mapped to different sub-bands respectively.

According to an embodiment of the method of transmitting data via the multi-antenna transmitter of the present invention, in step S2 the same data block grouping manner and different group-to-antenna mapping manners are adopted for the data blocks at different slots.

According to an embodiment of the method of transmitting data via the multi-antenna transmitter of the present invention, in step S2 the same data block grouping manner, the same group-to-antenna mapping manner and different sub-band mapping manners are adopted for the data blocks at different slots.

According to an embodiment of the method of transmitting data via the multi-antenna transmitter of the present invention, in step S1 the multiple data streams acquired are obtained through separate DFT respectively.

According to an embodiment of the method of transmitting data via the multi-antenna transmitter of the present invention, in step S1 the multiple data streams acquired are obtained through dividing data obtained after the same DFT.

Description of the present invention will be provided hereinafter in connection with specific transmitter structure.

Figure 4:
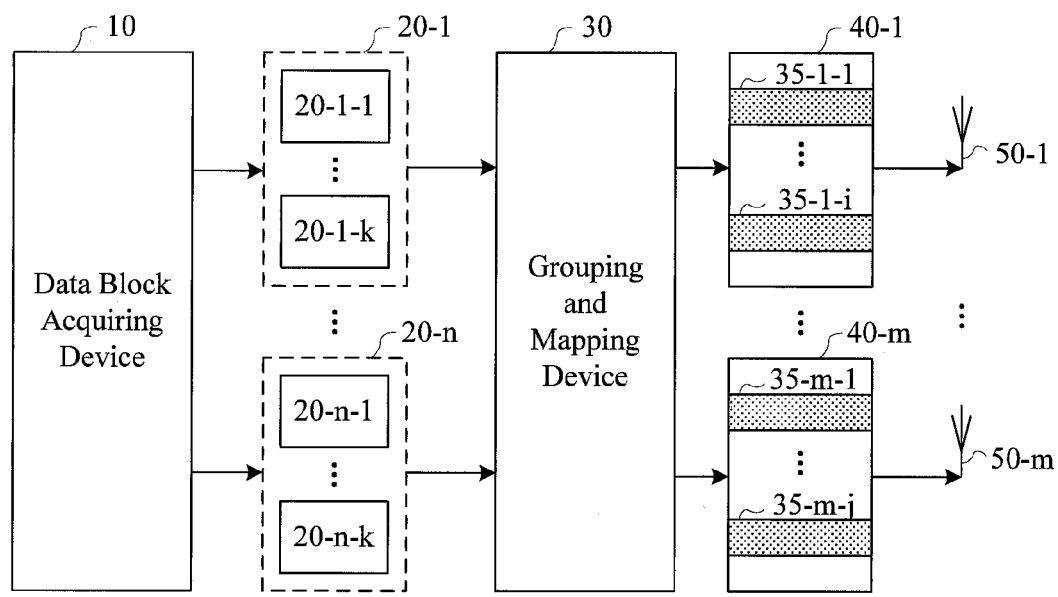
FIG. 4 is a structural block diagram illustrating a multi-antenna transmitter according to an embodiment of the present invention.

FIG. 4 is a structural block diagram illustrating a multi-antenna transmitter according to an embodiment of the present invention. As shown in FIG. 4, the transmitter in the embodiment includes a data block acquiring device 10, a grouping and mapping device 30, and multiple antennas 50-1 to 50-*m*.

The data block acquiring device 10 is utilized for acquiring multiple data streams, such as data streams 20-1 to 20-*n*. Each data stream includes data blocks at multiple slots. For example, the data stream 20-1 includes data blocks at k slots, which are shown as 20-1-1 to 20-1-*k* respectively. And the data stream 20-*n* also includes data blocks at k slots, which are shown as 20-*n*-1 to 20-*n*-*k* respectively. It will be understood by those skilled in the art that the present invention is not limited to the case where each data stream includes data blocks at the same number of slots.

The grouping and mapping device 30 is utilized for grouping and mapping each data block. The data blocks at the same slot in each data stream are grouped to multiple groups according to the number of the antennas, and each group is mapped to one of the antennas 50-1 to 50-*m* respectively. And the different data blocks in the same group are mapped to different sub-bands respectively. Grouping and mapping manners which are not exactly the same are adopted for the data blocks at different slots, and the grouping and mapping manners include data block grouping manners, group-to-antenna mapping manners, and sub-band mapping manners.

Usually, the quantity n of the data streams is greater than or equal to the quantity m of the antennas.

Preferably, the transmitter in the embodiment employs OFDM. Thus the transmitter further includes m IFFT (Inverse Fast Fourier Transform) modules corresponding to the m antennas respectively. The IFFT modules are utilized for modulating corresponding data onto the antennas 50-1 to 50-*m* according to the grouping and mapping manners of the grouping and mapping device 30. FIG. 4 illustrates m IFFT modules 40-1 to 40-*m*. Signs 35-1-1 to 35-1-*i* shown in the figure represent i sub-bands, and i data blocks are mapped to the i sub-bands of the antenna 50-1 respectively. Similarly, signs 35-*m*-1 to 35-*m*-*j* shown in the figure represent j sub-bands, and j data blocks are mapped to the j sub-bands of the antenna 50-*m* respectively. Usually, the sub-bands 35-1-1 to 35-1-*i* are discontinuous to each other. Similarly, the sub-bands 35-*m*-1 to 35-*m*-*j* are also discontinuous to each other. And more preferably, all the sub-bands are discontinuous to each other.

Finally, after being transformed by the IFFT modules, the data blocks at each slot in the above n data streams are transmitted via the antennas 50-1 to 50-*m*.

According to an embodiment of the present invention, the multi-antenna transmitter includes two antennas. This transmitter is particularly suitable for use in a user equipment of an LTE-A system, i.e., for uplink data transmission. It will be understood by those skilled in the art that the multi-antenna transmitter according to the present invention is not limited to a transmitter with two antennas.

According to an embodiment of the present invention, each data stream acquired by the data block acquiring device 10 of the transmitter corresponds to a subframe in an OFDM system, and each subframe includes two slots. That is, each data stream includes data blocks at two slots.

Figure 5:
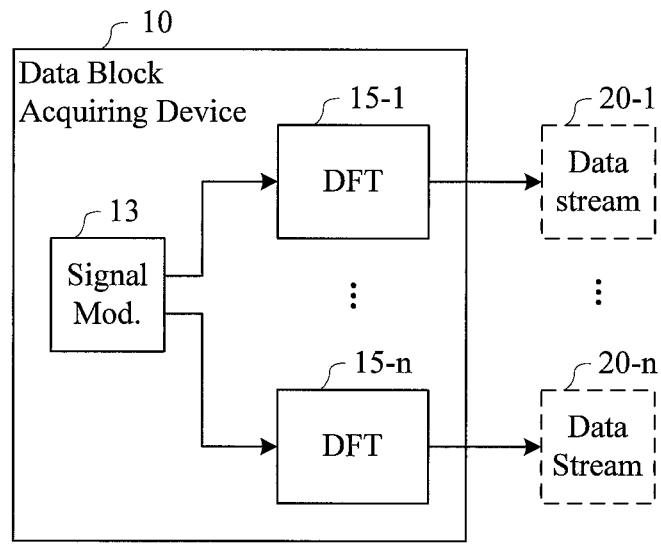
FIG. 5 is a structural diagram illustrating a data block acquiring device in a transmitter according to an embodiment of the present invention.

FIG. 5 is a structural diagram illustrating a data block acquiring device in a transmitter according to an embodiment of the present invention. As shown in FIG. 5, the data block acquiring device 10 of the transmitter includes a signal modulation module 13 and multiple DFT modules 15-1 to 15-*n*. The data modulated by the signal modulation module 13 is divided into n paths and each path of data is transformed by a DFT module, resulting in data streams 20-1 to 20-*n*. Those skilled in the art will understand that a source coding module or a combined source/channel coding module may be included before the signal modulation module 13, and that codes used in the coding modules may be Turbo codes. For example, according to some LTE-A proposals, a Turbo coding module is employed before a signal modulation module in a transmitter.

Figure 6:
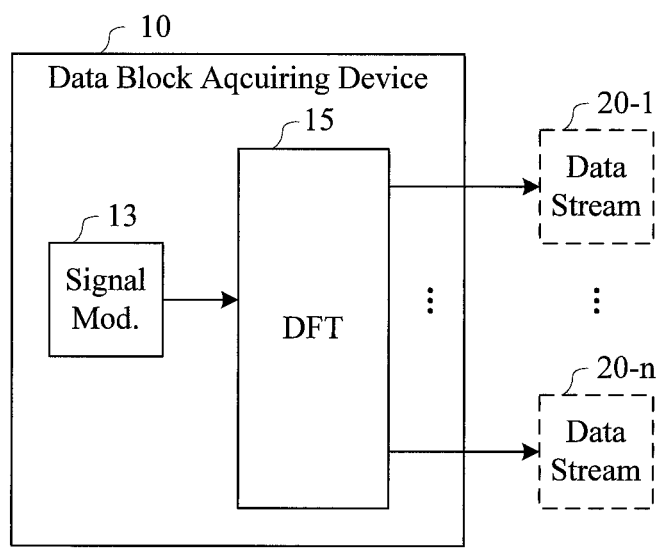
FIG. 6 is a structural diagram illustrating a data block acquiring device in a transmitter according to an embodiment of the present invention.

FIG. 6 is a structural diagram illustrating a data block acquiring device in a transmitter according to an embodiment of the present invention. As shown in FIG. 6, the data block acquiring device 10 of the transmitter includes a signal modulation module 13 and a DFT module 15. The data modulated by the signal modulation module 13 is input to the DFT module 15. The data after being discrete Fourier transformed is divided into n paths, resulting in data streams 20-1 to 20-*n* respectively. Those skilled in the art will understand that a source coding module or a combined source/channel coding module may be included before the signal modulation module 13, and that codes used in the coding modules may be Turbo codes. For example, according to some LTE-A proposals, a Turbo coding module is employed before a signal modulation module in a transmitter.

Figure 7:
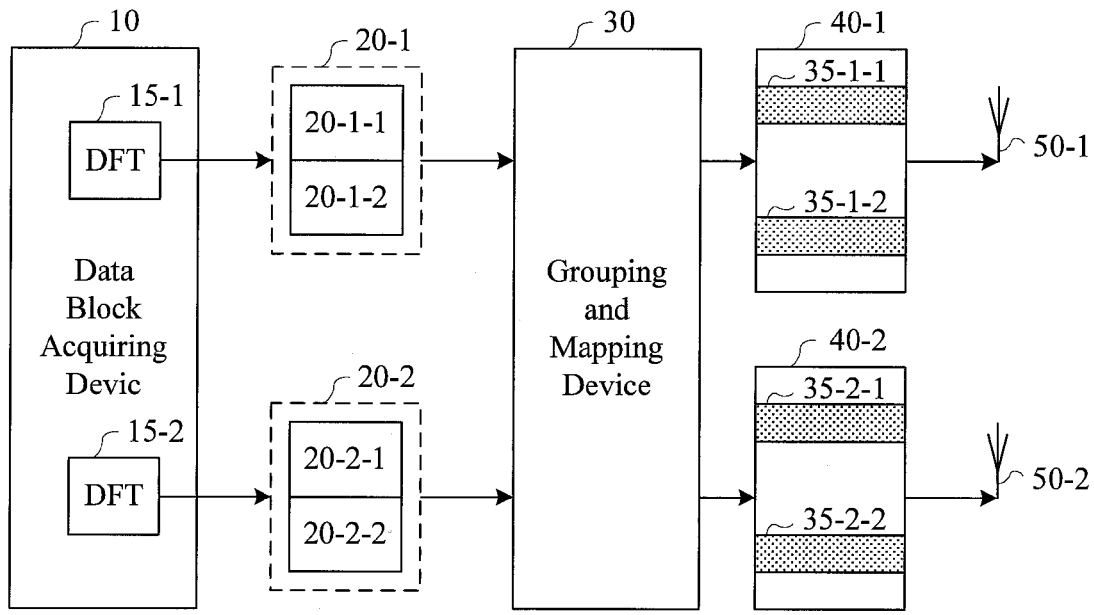
FIG. 7 is a structural diagram illustrating a multi-antenna transmitter according to an embodiment of the present invention.

According to an embodiment of the transmitter of the present invention, the transmitter includes two antennas, and the data acquiring device outputs two data streams. FIG. 7 is a structural diagram illustrating the transmitter in the embodiment. As shown in FIG. 7, the data block acquiring device 10 includes two DFT modules 15-1 and 15-2. Two data streams 20-1 and 20-2 are obtained through DFT, wherein the data stream 20-1 includes data blocks 20-1-1 and 20-1-2 at two slots and the data stream 20-2 includes data blocks 20-2-1 and 20-2-2 at two slots. The four data blocks are grouped and mapped by the grouping and mapping device 30, modulated onto different sub-bands of antennas 50-1 and 50-2 by IFFT modules 40-1 and 40-2 and then transmitted. Sub-bands occupied on the antenna 50-1 include sub-bands 35-1-1 and 35-1-2, and sub-bands occupied on the antenna 50-2 include sub-bands 35-2-1 and 35-2-2. In addition, the sub-bands 35-1-1 and 35-2-1 are identical sub-bands corresponding to the two antennas, and the sub-bands 35-1-2 and 35-2-2 are also identical sub-bands corresponding to the two antennas.

The grouping and mapping device 30 may adopt various grouping and mapping manners for the four data blocks. Since each slot has only two data blocks, two data blocks at the same slot are naturally divided into two groups each having one data block. The same data block grouping manner is consequentially adopted for data blocks at different slots.

In a first mapping manner, the grouping and mapping device 30 maps different data blocks at the same slot to different sub-bands, and adopts the same group-to-antenna mapping manner for data blocks at different slots. For example, at the first slot, the data block 20-1-1 is mapped to the sub-band 35-1-1 on the antenna 50-1, and the data block 20-2-1 is mapped to the sub-band 35-2-2 on the antenna 50-2; and at the second slot, the data block 20-1-2 is mapped to the sub-band 35-1-2 on the antenna 50-1, and the data block 20-2-2 is mapped to the sub-band 35-2-1 on the antenna 50-2. In this manner, data blocks at different slots in a data stream are mapped to different sub-bands and transmitted via the same antenna, thereby achieving frequency diversity gain. And data in the two data streams are transmitted via one of the antennas, which mitigates the PAPR of each antenna. Those skilled in the art will understand that this manner is more suitable for the case where different data streams occupy resource blocks of the same size.

In a second mapping manner, the grouping and mapping device 30 maps different data blocks at the same slot to different sub-bands, and adopts different group-to-antenna mapping manners for data blocks at different slots. For example, at the first slot, the data block 20-1-1 is mapped to the sub-band 35-1-1 on the antenna 50-1, and the data block 20-2-1 is mapped to the sub-band 35-2-2 on the antenna 50-2; and at the second slot, the data block 20-1-2 is mapped to the sub-band 35-2-1 on the antenna 50-2, and the data block 20-2-2 is mapped to the sub-band 35-1-2 on the antenna 50-1. In this manner, data blocks at different slots in a data stream are mapped to the same sub-band but transmitted via different antennas, thereby achieving spatial diversity gain. And the two antennas transmit part of data in the two data streams respectively, which mitigates the PAPR of each antenna.

In this embodiment, the band resources occupied on the two antennas 50-1 and 50-2 are the same. Those skilled in the art will understand that the band resources occupied on the two antennas may be different, i.e., the sub-bands 35-1-1 and 35-1-2 are different from the sub-bands 35-2-1 and 35-2-2. In such a situation, the grouping and mapping device 30 may adopt more flexible data-to-sub-band mapping.

Figure 8:
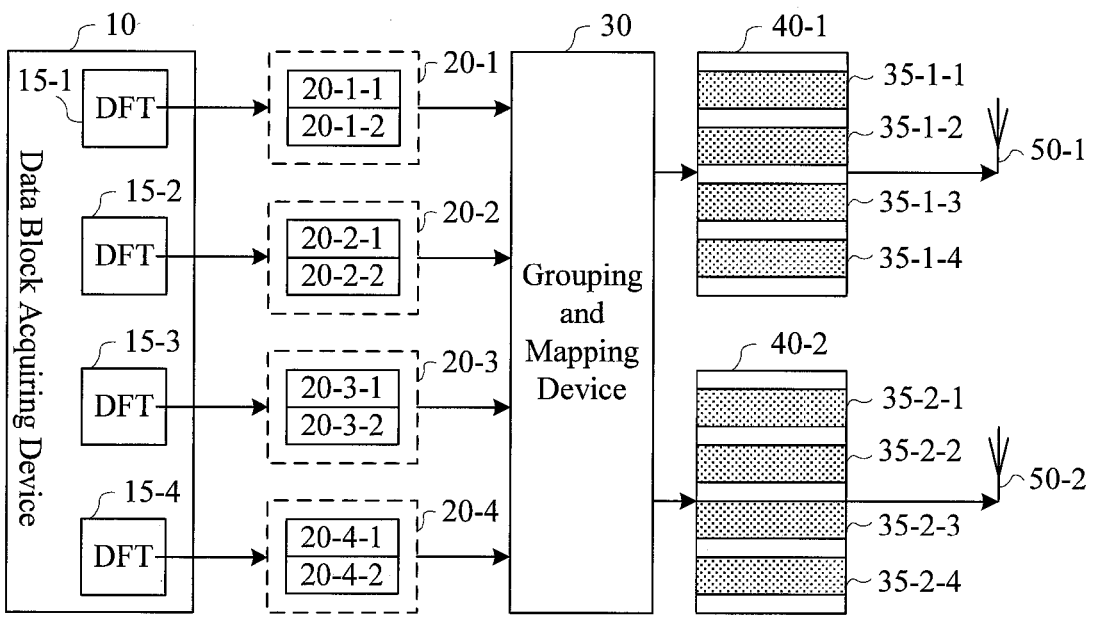
FIG. 8 is a structural diagram illustrating a multi-antenna transmitter according to an embodiment of the present invention.

According to an embodiment of the transmitter of the present invention, the transmitter includes two antennas, and the data acquiring device outputs four data streams. FIG. 8 is a structural diagram illustrating the transmitter in the embodiment. As shown in FIG. 8, the data block acquiring device 10 includes four DFT modules 15-1, 15-2, 15-3 and 15-4. Data streams 20-1, 20-2, 20-3 and 20-4 are obtained through DFT. The data stream 20-1 includes data blocks 20-1-1 and 20-1-2 at two slots, the data stream 20-2 includes data blocks 20-2-1 and 20-2-2 at two slots, the data stream 20-3 includes data blocks 20-3-1 and 20-3-2 at two slots, and the data stream 20-4 includes data blocks 20-4-1 and 20-4-2 at two slots. The eight data blocks are grouped and mapped by the grouping and mapping device 30, modulated onto different sub-bands of antennas 50-1 and 50-2 by IFFT modules 40-1 and 40-2 and then transmitted. Sub-bands occupied on the antenna 50-1 include sub-bands 35-1-1, 35-1-2, 35-1-3 and 35-1-4, and sub-bands occupied on the antenna 50-2 include sub-bands 35-2-1, 35-2-2, 35-2-3 and 35-2-4. In addition, the sub-bands 35-1-1 and 35-2-1 are identical sub-bands corresponding to the two antennas, the sub-bands 35-1-2 and 35-2-2 are identical sub-bands corresponding to the two antennas, and so are the sub-bands 35-1-3 and 35-2-3, and the sub-bands 35-1-4 and 35-2-4.

The grouping and mapping device 30 may adopt various grouping and mapping manners for the four data blocks.

Since each slot has four data blocks, there are various grouping manners to group the four data blocks at the same slot into two groups. One grouping manner is designed such that each of the two groups at the same slot includes two data blocks. For example, the data blocks 20-1-1 and 20-2-1 are grouped into one group, and the data blocks 20-3-1 and 20-4-1 are grouped into the other group. Another grouping manner is designed such that the two groups at the same slot include three data blocks and one data block respectively. For example, the data blocks 20-1-1, 20-2-1 and the data blocks 20-3-1 are grouped into one group, and the data block 20-4-1 is grouped into the other group.

For data blocks at different slots, either the same data block grouping manner or different data block grouping manners may be adopted.

In a first mapping manner, the grouping and mapping device 30 groups four data blocks at the same slot to two groups, each including two data blocks, and adopts the same data block grouping manner and the same group-to-antenna mapping manner for data blocks at different slots. For example, at the first slot, the data blocks 20-1-1 and 20-2-1 are grouped into one group and mapped to the sub-bands 35-1-1 and 35-1-2 on the antenna 50-1 respectively, and the data blocks 20-3-1 and 20-4-1 are grouped into the other group and mapped to the sub-bands 35-2-3 and 35-2-4 on the antenna 50-2 respectively; and at the second slot, the data blocks 20-1-2 and 20-2-2 are grouped into one group and mapped to the sub-bands 35-1-3 and 35-1-4 on the antenna 50-1 respectively, and the data blocks 20-3-2 and 20-4-2 are grouped into the other group and mapped to the sub-bands 35-2-1 and 35-2-2 on the antenna 50-2 respectively. In this manner, data blocks at different slots in a data stream are mapped to different sub-bands and transmitted via the same antenna, thereby achieving frequency diversity gain. And data in the four data streams are transmitted via one of the antennas, which mitigates the PAPR of each antenna. Those skilled in the art will understand that this manner is more suitable for the case where different data streams occupy resource blocks of the same size.

In a second mapping manner, the grouping and mapping device 30 groups four data blocks at the same slot to two groups each including two data blocks, and adopts the same data block grouping manner and different group-to-antenna mapping manners for data blocks at different slots. For example, at the first slot, the data blocks 20-1-1 and 20-2-1 are grouped into one group and mapped to the sub-bands 35-1-1 and 35-1-2 on the antenna 50-1 respectively, and the data blocks 20-3-1 and 20-4-1 are grouped into the other group and mapped to the sub-bands 35-2-3 and 35-2-4 on the antenna 50-2 respectively; and at the second slot, the data blocks 20-1-2 and 20-2-2 are grouped into one group and mapped to the sub-bands 35-2-2 and 35-2-1 on the antenna 50-2 respectively, and the data blocks 20-3-2 and 20-4-2 are grouped into the other group and mapped to the sub-bands 35-1-4 and 35-1-3 on the antenna 50-1 respectively. In this manner, data blocks at different slots in a data stream are mapped to different sub-bands and transmitted via different antennas, thereby achieving frequency diversity gain and spatial diversity gain. And the two antennas transmit part of data in the four data streams respectively, which mitigates the PAPR of each antenna.

In this embodiment, the band resources occupied on the two antennas 50-1 and 50-2 are the same. Those skilled in the art will understand that the band resources occupied on the two antennas may be different, i.e., the sub-bands 35-1-1, 35-1-2, 35-1-3 and 35-1-4 are different from the sub-bands 35-2-1, 35-2-2, 35-2-3 and 35-2-4. In such a situation, the grouping and mapping device 30 may adopt more flexible data-to-sub-band mapping.

The multi-antenna transmitter of the present invention is particularly suitable for implementing the data transmission method of the present invention. However, those skilled in the art will understand that the data transmission method of the present invention is not limited to be implemented by the multi-antenna transmitter disclosed in the present invention.

Figure 9:
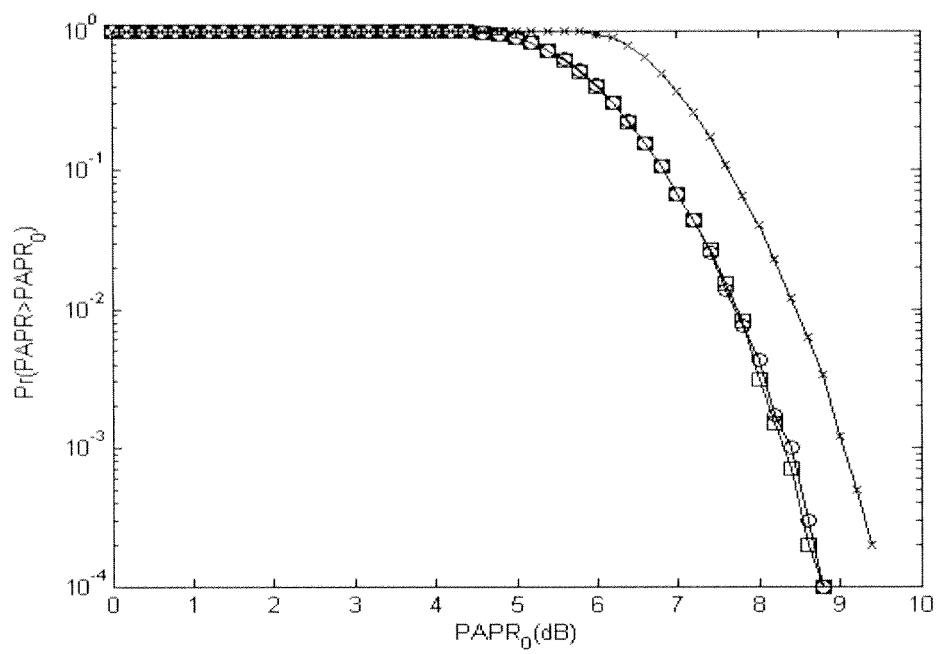
FIG. 9 is a simulation plot of the PAPRs of several transmitter solutions.

FIG. 9 is a simulation plot of the PAPRs of the prior art solutions 1 and 2, and the transmitter solution shown in FIG. 7. Both 15-1 and 15-2 shown in FIG. 7 are an M-point DFT module, and the data acquiring device 10 further includes a signal modulation module. The simulation conditions are as follows: each signal modulation module in the three solutions adopts 16QAM modulation; a 2M-point DFT module is included in the prior art solution 1, and two M-point DFT modules are included in both the prior art solution 2 and the solution shown in FIG. 7, where the value of M is 60; each IFFT module in the three solutions adopts 1024-point transform. In FIG. 9, the abscissa represents the PAPR in dB, and the ordinate represents the probability that a corresponding PAPR is reached or exceeded. The curve connecting cross markers is performance curve of the prior art solution 1, the curve connecting square markers is performance curve of the prior art solution 2, and the curve connecting round markers is performance curve of the solution shown in FIG. 7. It is observed from the simulation results that the PAPR performance of the solution shown in FIG. 7 approximates to that of the prior art solution 2 and is better than that of the prior art solution 1.

Figure 10:
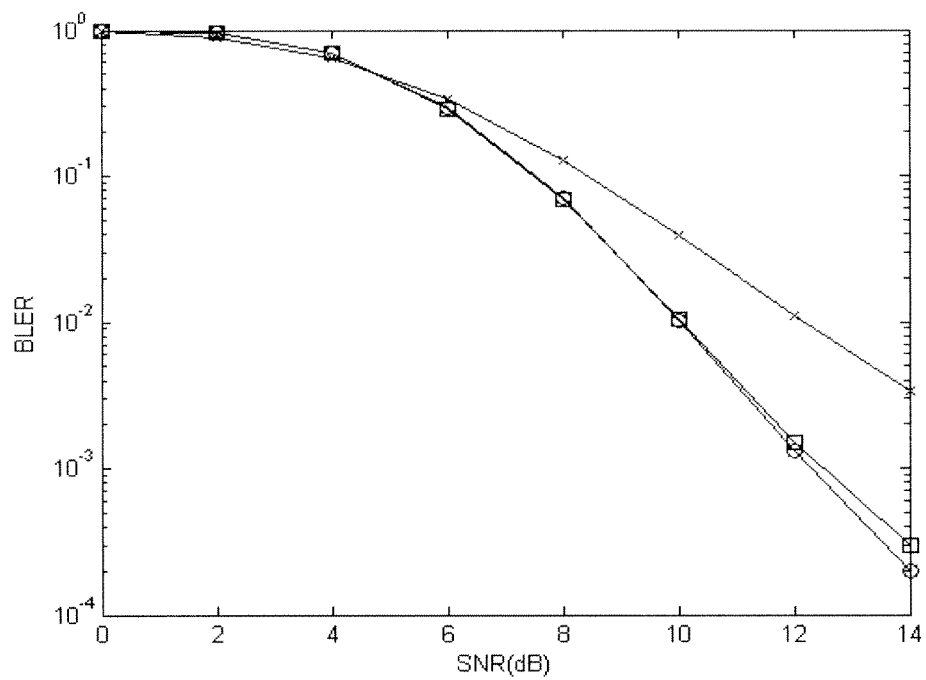
FIG. 10 is a simulation plot of the BLERs of several transmitter solutions.

FIG. 10 is a simulation plot of the BLERs of the prior art solution 2, and the first and second grouping and mapping manners of the transmitter solution shown in FIG. 7. Both 15-1 and 15-2 shown in FIG. 7 are an M-point DFT module, and the data acquiring device 10 further includes a Turbo coding module and a signal modulation module. The sub-bands 35-1-1 and 35-2-1 correspond to the sub-band 1 in the prior art solutions 1 and 2, and the sub-bands 35-1-2 and 35-2-2 correspond to the sub-band 2 in the prior art solutions 1 and 2. The simulation conditions include: carrier frequency of the OFDM signals is 2 GHz, and the transmission bandwidth is 10 MHz; 1024-point FFT is adopted; length of a data stream, i.e., a subframe is 1 ms; 10 resource units are allocated to each data stream; the DFT modules are determined according to the value of M, i.e., 60; the signal modulation module adopts 16QAM modulation; the coding module adopts Turbo coding with a 1/2 code rate; each data stream is 2880 bits; localized mapping is adopted for sub-band mapping; two sub-bands are separated by 600 subcarriers, i.e., about 6 MHz; 3GPP SCME (Space Channel Model Extended) with fixed parameters is adopted as the channel model; the scenario is urban macro (NLOS); the antennas are configured such that two antennas of the transmitter (mobile station) are spaced with 0.5 wavelength and two antennas of the receiver (base station) are spaced with 10 wavelengths; the velocity of the transmitter is set to 30 kmph; channel estimation is perfect channel estimation; SNR is defined as the total received power per receive antenna to the noise power ratio in frequency domain. In FIG. 10, the abscissa represents the SNR in dB, and the ordinate represents the BLER. And each curve in FIG. 10 is a BLER vs. SNR performance curve. The curve connecting cross markers is performance curve of the prior art solution 2, the curve connecting round markers is performance curve of the first grouping and mapping manner of the solution shown in FIG. 7, and the curve connecting square markers is performance curve of the second grouping and mapping manner of the solution shown in FIG. 7. It is observed from the simulation results that the BLER performance of the solution shown in FIG. 7 is better than that of the prior art solution 2.

Those skilled in the art will understand that each of the devices mentioned in the present invention may be implemented by either a hardware module, or a functional module in a software, or even a hardware module integrated with a software functional module.

The transmitter of the present invention may be suitable for use in clustered DFT-S-OFDM, and particularly, for uplink data transmission.

The non-limiting embodiments of the present invention are described above. However, the present invention is not limited to particular systems, equipments and specific protocols. And variations or modifications can be made by those skilled in the art within the scope of the appended claims.

The invention claimed is:

1. A method of transmitting data via a multi-antenna transmitter, the method comprising:
    A. acquiring multiple data streams, wherein each data stream comprises data blocks at multiple slots;
    B. grouping and mapping each data block, wherein the data blocks at the same slot in each data stream are grouped according to the number of the antennas and each group is mapped to one of the antennas respectively, and the different data blocks in the same group are mapped to different sub-bands respectively; and wherein grouping and mapping manners which are not exactly the same are adopted for the data blocks at different slots, and the grouping and mapping manners comprise data block grouping manners, group-to-antenna mapping manners, and sub-band mapping manners;
    C. transmitting the groups of data blocks at the multiple slots via the antennas respectively.

2. A multi-antenna transmitter comprising:
    a data block acquiring device for acquiring multiple data streams, wherein each data stream comprises data blocks at multiple slots; and
    a grouping and mapping device for grouping and mapping each data block, wherein the data blocks at the same slot in each data stream are grouped according to the number of the antennas and each group is mapped to one of the antennas respectively, and the different data blocks in the same group are mapped to different sub-bands respectively, and wherein grouping and mapping manners which are not exactly the same are adopted for the data blocks at different slots, and the grouping and mapping manners comprise data block grouping manners, group-to-antenna mapping manners, and sub-band mapping manners;

wherein the groups of data blocks at the multiple slots are transmitted via the antennas respectively.

3. The transmitter of claim 2, wherein the transmission employs clustered DFT-S-OFDM.

4. The transmitter of claim 2, wherein the grouping and mapping device maps each data block at the same slot to a different sub-band respectively.

5. The transmitter of claim 2, wherein all the sub-bands are discontinuous.

6. The transmitter of claim 2, wherein the grouping and mapping device adopts the same data block grouping manner and different group-to-antenna mapping manners for the data blocks at different slots.

7. The transmitter of claim 2, wherein the grouping and mapping device adopts the same data block grouping manner, the same group-to-antenna mapping manner and different sub-band mapping manners for the data blocks at different slots.

8. The transmitter of claim 2, wherein the transmitter comprises two antennas.

9. The transmitter of claim 8, wherein the data block acquiring device is utilized for acquiring two data streams, each comprising the data blocks at multiple slots; and the grouping and mapping device maps two data blocks at the same slot to the two antennas respectively and to different sub-bands respectively.

10. The transmitter of claim 9, wherein the two data streams comprise the data blocks at two slots respectively.

11. The transmitter of claim 10, wherein the grouping and mapping device maps the data blocks in the two data streams to the two antennas respectively and maps the data blocks at the two slots in the same data stream to different sub-bands respectively.

12. The transmitter of claim 10, wherein the grouping and mapping device maps the data blocks at the two slots in the same data stream to the two antennas respectively.

13. The transmitter of claim 8, wherein the data block acquiring device is utilized for acquiring four data streams, each comprising the data blocks at multiple slots; and the grouping and mapping device groups four data blocks at the same slot to two groups, each comprising two data blocks, and maps the two groups of data blocks to one of the two antennas respectively, and maps the two data blocks in the same group to different sub-bands respectively.

14. The transmitter of claim 13, wherein the grouping and mapping device adopts the same data block grouping manner and different group-to-antenna mapping manners for the data blocks at different slots.

15. The transmitter of claim 13, wherein the grouping and mapping device adopts the same data block grouping manner, the same group-to-antenna mapping manner and different sub-band mapping manners for the data blocks at different slots.

* * * * *